(12) United States Patent
Andre et al.

(10) Patent No.: US 7,904,325 B2
(45) Date of Patent: *Mar. 8, 2011

(54) SYSTEM AND METHOD FOR COMPLEX SCHEDULE GENERATION

(75) Inventors: David Andre, Berkeley, CA (US); Illah Nourbakhsh, Pittsburgh, PA (US); Serdar Uckun, Palo Alto, CA (US)

(73) Assignee: Verint Americas Inc., Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/612,487

(22) Filed: Nov. 4, 2009

(65) Prior Publication Data

US 2010/0153170 A1 Jun. 17, 2010

Related U.S. Application Data

(63) Continuation of application No. 11/736,124, filed on Apr. 17, 2007, now Pat. No. 7,634,422, which is a continuation of application No. 11/479,924, filed on Jun. 30, 2006, now Pat. No. 7,254,546, which is a continuation of application No. 09/825,589, filed on Apr. 3, 2001, now Pat. No. 7,155,399.

(51) Int. Cl.
*G06Q 10/00* (2006.01)
(52) U.S. Cl. .................................. 705/9; 705/11
(58) Field of Classification Search ............. 379/265.12; 705/7, 9, 11
See application file for complete search history.

(56) References Cited

U.S. PATENT DOCUMENTS

| | | | | |
|---|---|---|---|---|
| 5,134,574 A * | 7/1992 | Beaverstock et al. | ........... | 702/84 |
| 5,185,780 A * | 2/1993 | Leggett | .................... | 379/265.08 |
| 5,325,292 A * | 6/1994 | Crockett | .......................... | 705/9 |
| 5,778,060 A * | 7/1998 | Otto | ........................ | 379/266.09 |
| 5,911,134 A * | 6/1999 | Castonguay et al. | ............. | 705/9 |
| 6,058,163 A * | 5/2000 | Pattison et al. | .......... | 379/265.06 |
| 6,058,370 A * | 5/2000 | Church et al. | .................. | 705/10 |
| 6,381,640 B1 * | 4/2002 | Beck et al. | ..................... | 709/223 |
| 6,614,903 B1 * | 9/2003 | Flockhart et al. | ........ | 379/265.12 |
| 6,823,315 B1 * | 11/2004 | Bucci et al. | ....................... | 705/9 |

OTHER PUBLICATIONS

TMC Labs, "PrimeTime Enterprise Receives Editors' Choice", Jul. 1999, Call Center Solutions, pp.1-6, http://archive.bibalex.org/web/20000229044631/blue-pumpkin.com/reviews/ccs0799_eds_choice.html.*

(Continued)

*Primary Examiner* — Jonathan G Sterrett
(74) *Attorney, Agent, or Firm* — Setter Roche LLP

(57) ABSTRACT

A system and method for generating a schedule for multiple employees in a complex environment. In one embodiment, the method includes generating a schedule for multiple employees with varying skill sets for a time period, wherein the plurality of employees have varying overlapping skill sets that enable them to perform various tasks, and wherein employees are shared across tasks within the time period. In one embodiment, the method includes receiving a plurality of user inputs to a scheduling program, including a number of employee designations that each refer to a unique employee, and a number of skill sets that each correspond to one of the employee designations. The method further includes receiving a user input that changes the number of employee designations by indicating at least one changed employee, and estimating an effect of the at least one changed employee on effective staffing levels for each of the various tasks. The method further includes generating estimated effective staffing levels for each of the various tasks.

19 Claims, 4 Drawing Sheets

OTHER PUBLICATIONS

Monegain, Bernie, "Avis Takes Charge of Airport Staffing", Mar. 2000, Call Center News, pp. 1-2, http://archive.bibalex.org/web/20000229044631/blue-pumpkin.com/reviews/ccnews0300.html.*

White, Ron, "How Computers Work—Millennium Edition", 1999, Macmillan Computer Publishing, p. 131.*

Leamon, Paul, "Workforce Management with Skills-Based Call Routing: The New Challenge", Mar. 1999, Call Center Solutions, pp. 88-93.*

"Maxima Advantage", Jan. 2000, Call Center CRM Solutions, 18, 7; ABI/Inform global, p. 94.*

Business Wire, "Blue Pumpkin Software Launches Expansion into Canada", Jan. 3, 2000, New York, p. 1. ProQuest Document ID 47601849.*

Cleveland, Brad, "How Do You Calculate Staff", Teleprofessional, Aug. 1999, 12, 8; ProQuest Telecommunications, p. 98.*

Muraskin, Ellen, "Outbound unbound", Feb. 2000, Computer Telephony, 8, 2; ProQuest Computing, p.93.*

Byrnes, Hellen, "Merging Priorities", Jan. 2000, Credit Union Management, 23, 1; ABI/INFORM Global, p. 46.*

Matan, Ofer; Nourbakhsh, Illah; "Playing the Numbers: Using ACD Statistics for Workforce Management", Mar. 1998, Telemarketing and Call Center Solutions; 16, 9; ABI/INFORM Global, p.118.*

Heijenrath, Joop; Sheahan, Marie; "Managing Multilingual IT Support Centers in Europe", Sep. 1998, Call Center Solutions, 17, 3, ABI/INFORM Global, p. 88.*

Lounsbury, Erik, "A Panoramic View of What's High-Tech in Florida", Call Center CRM Solutions, Apr. 2000, 18, 10; ABI/INFORM Global, p. 92.*

Business Wire, "Blue Pumpkin Software Announces First Comprehensive Scheduling Solution For Global Contact Centers With Complex Work Rules", Jan. 25, 2000, p. 1.*

Vartabedian, Matthew, "Well, That's Switch", Jun. 1998. Telemarketing and Call Center Solutions, 16, 12; ABI/INFORM Global, p. 48.*

Bayless, Jeanne, "The most influential CTI Companies", Nov. 1995, Telemarketing, v14n5, pp. ss6-ss39, Dialog 01136674 97-86068.*

Vartabedian, Matthew, "A little of this, and a pinch of that", Oct. 1998, Call Center Solutions, v17n4, pp. 46-50, Dialog 07817222 04-68213.*

"Performance Measurement & Small to Mid-sized Call Center Solutions", Mar. 1999, Call Center Solutions, v17n9, p. 22, Dialog 01819003 04-69994.*

Marlin, Steven, "Intelligent' telecenters", Jun. 1999, Bank Systems & Technology, v36n6, pp. 28-34, Dialog 01833926 04-84917.*

Davis, Scott, "Close calls", Oct. 1997, Communications News, v34n10, pp. 60, Dialog 01519006 01-69994.*

Blue-Pumpkin webpages "PrimeTime Enterprise, Workforce management scheduling for quality customer service", Mar. 7, 2000.*

Hefline, Deborah; Harrel, Charles R., "Simulation Modelling and Optimization using ProModel™", Proceedings of the 1998 Winter Simulation Conference, 1998, pp.191-197.*

Web.archive.org's webpage of Feb. 21, 1999, describing ProModel software, "Capacity Planning using ProModel Simulation".*

Web.archive.org's webpage of Apr. 18, 1999, describing Survey ProModel software, "Product Guide".*

* cited by examiner

US 7,904,325 B2

SYSTEM AND METHOD FOR COMPLEX SCHEDULE GENERATION

CROSS-REFERENCE TO RELATED APPLICATIONS

This application is a continuation of U.S. utility application having Ser. No. 11/736,124, filed Apr. 17, 2007 now U.S. Pat. No. 7,634,422, which is a continuation of U.S. utility application having Ser. No. 11/479,924, filed Jun. 30, 2006, now U.S. Pat. No. 7,254,546 issued on Aug. 7, 2007, which is a continuation of U.S. utility application having Ser. No. 09/825,589, filed Apr. 3, 2001, now U.S. Pat. No. 7,155,399 issued on Dec. 26, 2006, all of which are entirely incorporated herein by reference.

FIELD OF THE INVENTION

The invention is in the field of generating complex schedules in dynamic environments, such as call centers.

BACKGROUND

Generating schedules for employees is a complex problem for enterprises. Telephone call center scheduling is an example of a scheduling problem with a large number of variables. Variables include call volume at a particular time of day, available staff, skills of various staff members, call type (e.g., new order call and customer service call), and number of call queues, where a queue may be assigned a particular call type. A basic goal of call center scheduling is to minimize the cost of operators, or agents, available to answer calls while maximizing service. Quality of service, or service level, can be quantified in various ways. One common metric for call service level is the percentage of incoming calls answered in a predetermined time, e.g. thirty seconds. The call center may receive calls of various types that are assigned to respective call queues.

Traditionally, call center scheduling is performed by first forecasting incoming call volumes and estimating average talk times for each time period t (based on past history and other measures). The forecast is based upon historical data. Next, a closed-form formula known as reverse Erlang-C is used to compute full-time equivalent (FTE) agent requirements to provide a desired service level for each time period t. Such a method is described in Elementary Queuing Theory and Telephone Traffic, by Petr Beckmann, 1977 (Lee's abc of the Telephone Training Manuals, Geneva, Ill.) After the FTE agent requirements are computed, the required number of agents are scheduled for each time period t.

At a call center, calls of different types are typically placed onto different queues by an Automatic Call Distributor (ACD). The calls wait at the ACD for an operator to answer them. At many modern call centers, the agents cannot answer any type of call; they can only answer calls for which they have the prerequisite skill. At some call centers, there is a group of agents for each type of call that comes in, which means that each group (and queue of calls) can be treated as a separate problem. However, at an increasing number of call centers, agents are multi-skilled, and can answer calls from a variety of queues. Typically, not all agents have the same skills, and thus some agents can answer some calls while other agents cannot. The ACD distributes calls waiting in different queues to agents who are skilled to handle calls from the respective queues. This distribution task is referred to as skill-based routing. Determining agent schedules for this latter type of call center is known as the skill-based scheduling problem. It is considerably more difficult than the basic call center scheduling problem because of all the interactions between queues.

The skills-based scheduling problem has no known closed-form solution that can be used to estimate available FTE levels for each queue when agents are shared among queues. Prior attempts to solve the skills-based scheduling problem involve the use of a discrete event ACD simulator to validate estimates. For example, the skills-based scheduling technique disclosed in U.S. Pat. No. 6,044,355 includes forming skill groups that contain agents with identical sets of skills, preferences, and priorities. A "skill group availability array" is then generated that attempts to estimate what percentage of scheduled agents of each skill type will be available to each call type during each time interval. Erlang processing and ACD simulation are used to increase the accuracy of the percentage estimates, and standard call center schedule algorithms can then be used for scheduling.

Such prior solutions have other serious limitations. For example, the array grows exponentially as the number of skills grow. This is particularly true because the skill group is inflexible in that each different combination of skill, preference, priority, and proficiency requires the creation of a new skill group. The size of the array may thus reach a level at which processing time is too great and processing resources are inadequate. Another limitation of prior methods is that they do not allow for the easy determination of fine-grain changes to the schedule such as the addition or subtraction of a single agent. The current methods require that the entire algorithm be executed again for any incremental change, such as the addition or subtraction of one agent.

Other prior methods for skills-based scheduling use skill groups (similar to those disclosed in U.S. Pat. No. 6,044,355) and are limited to the assumption that each individual agent simply splits time at a predetermined ratio between various queues (task switching). In such methods, at any given time, each agent is limited to taking calls from queues assigned to his or her skill group at that time. Each agent is unable to take calls from other queues that he or she may be skilled in. This is a serious limitation, potentially causing some queues to overflow because the assigned skill group is busy, while there may be idle agents in other skill group who are capable of taking those calls.

Another serious limitation of prior methods is that they provide relatively coarse approximations of schedules that fail to take into account all of the dynamics of a situation. For example, if an agent from a new skill group is added to the schedule, the performance of call queues that are not handled by the new agent may change. These complex dynamics are not modeled well in available scheduling methods.

Another limitation of current methods is that simulation must be performed for each iteration of the algorithm. One reason for this requirement is the failure of prior methods to estimate individual contributions of single agents to particular queues. This is expensive and time consuming.

Yet another disadvantage of prior methods for solve scheduling problems is that the algorithms of prior methods may require excessive time to execute because the prior methods are not designed to facilitate parallel processing.

SUMMARY OF THE DISCLOSURE

A system and method for generating a schedule for multiple employees in a complex environment is described. In one embodiment, the method includes generating a schedule for multiple employees with varying skill sets for a time period, wherein the plurality of employees have varying overlapping skill sets that enable them to perform various tasks, and wherein employees are shared across tasks within the time period. In one embodiment, the method includes receiving a plurality of user inputs to a scheduling program, including a number of employee designations that each refer to a unique employee, and a number of skill sets that each correspond to one of the employee designations. The method further includes receiving a user input that changes the number of employee designations by indicating at least one changed employee, and estimating an effect of the at least one changed employee on effective staffing levels for each of the various tasks. The method further includes generating estimated effective staffing levels for each of the various tasks.

DETAILED DESCRIPTION

A system and method for generating complex schedules in complex environments, such as call center environments, is described. The embodiments described include generating schedules for multiple employees, or agents, each having different sets of skills that enable them to perform various tasks. An agent may be shared across various tasks within one scheduled time period.

Figure 1:
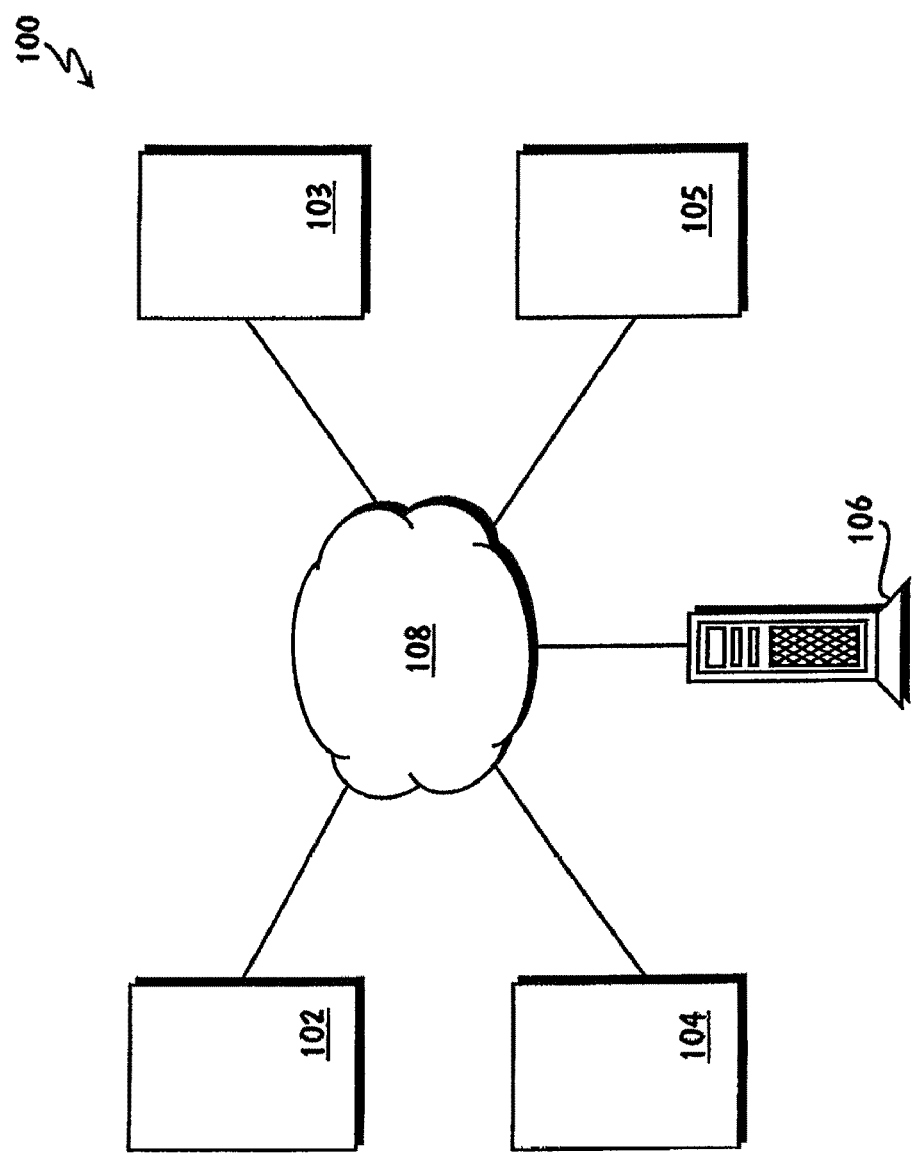
FIG. 1 is a block diagram of an embodiment of a system for complex schedule generation.

FIG. 1 is an embodiment of a system 100 for generating complex schedules. The system includes multiple client computers 102-105, which are coupled to the server 106 through a network 108. The network 108 can be any network, such as a local area network, a wide area network, or the Internet. The client computers each include one or more processors and one or more storage devices. Each of the client computers also includes a display device, and one or more input devices. The server 106 includes one or more storage devices. All of the storage devices store various data and software programs. In one embodiment, methods for generating complex schedules are carried out on the system 100 by software instructions executing on one or more of the client computers 102-105. The software instructions may be stored on the server 106 or on any one of the client computers. For example, one embodiment is a hosted application used by a call center of an enterprise that requires complex scheduling of many employees. The software instructions are stored on the server and accessed through the network by a client computer operated by the enterprise. In other embodiments, the software instructions may be stored and executed on the client computer. Data required for the execution of the software instructions can be entered by a user of the client computer with the help of a specialized user interface. Data required for the execution of the software instructions can also be accessed via the network and can be stored anywhere on the network.

One example of a complex schedule is an agent schedule for a call center. A call center is an organization that answers calls from customers of an enterprise. An agent is an employee that is trained to answer calls. Each agent can have a different skill set. For example, one agent may be trained to answer live telephone help inquiries regarding certain products, respond to email regarding certain products, receive telephone purchase orders for certain products, etc. The agent may be assigned to multiple call queues within a time period. A call queue handles one type of contact requiring a particular skill or skills. The possible number of skill sets includes every permutation of combinations of the existing skills in the organization. Each agent has a particular skill set, but the skill sets among different agents may overlap. In embodiments of the invention, as described more fully below, a user who is performing scheduling can quickly determine the overall effect on the entire schedule of removing or adding a single agent or more without restarting the entire scheduling process. The overall effect on the schedule accounts for the effect on each call queue, even those queues that are not worked by the agent or agents being added or subtracted from the schedule. These queues are affected because the agents handling those queues will have more or less time to spend handling those queues as a result of handling more or less work on the queues that are usually worked by the agent or agents being added or subtracted. Embodiments of the invention also reduce the number of schedule simulations required in the scheduling process by performing simulations only at intervals. As described more fully below, it is determined at what intervals simulation is necessary.

Figure 2:
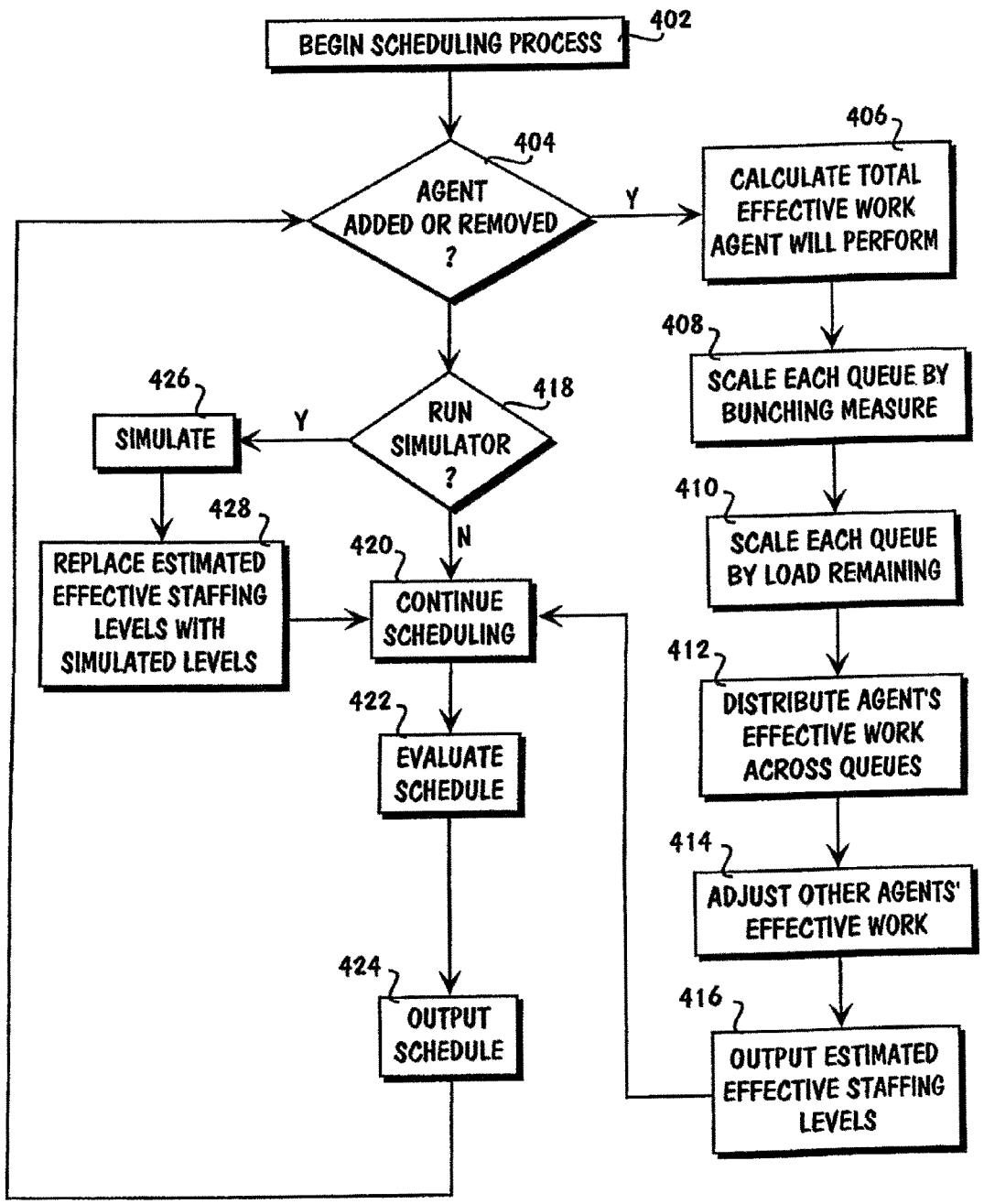
FIG. 2 is a flow diagram of an embodiment of complex schedule generation.

FIG. 2 is a high-level flow diagram of one embodiment of complex scheduling. The scheduling process is begun at 402. The scheduling process includes a user interacting with a scheduling program through a user interface. The scheduling process includes the user making entries such as agent designations, agent skills, agent preference, and agent priorities. An agent designation can be a name, a social security number, an employee number, or any other designation that uniquely identifies an employee.

At 404, it is determined whether the user has added an agent to the schedule or removed an agent from the schedule. If the user has made such a change, an estimation function generates an estimate of the resultant change in the effective staffing of each queue. In one embodiment, the estimation function is described at a high level by 406-416. The estimation function takes as inputs the skill set, proficiencies, priorities, and preferences of the added or removed agent, or "changed agent". The estimation function also takes various statistics about each queue as input. The various statistics include call volume, average handling time per call, and the performance as measured by a previous simulation.

At 406, the total effective work the changed agent will perform is calculated. As a function of call center configuration statistics, including but not limited to the number of queues the agent is trained to handle, the total amount of effective work (i.e. effective FTE's, or effective Erlangs of work) that the agent will do is calculated. In one embodiment a lookup table is used. In the lookup table, the number of queues is the index and the amount of effective work contributed is the data. This lookup table can be populated empirically using a simulator, or it can be populated empirically using measurements from a sample of real call centers. The lookup table can also be designed to be adaptively filled and changed over time to most closely correspond to events in a particular call center. For discussion purposes, the total work estimated for an agent is called "W".

As shown at 408 and 410, the bunching factors for each queue and load remaining factors for each queue are calculated and used to scale each queue. Other factors may also be used to scale each queue. The bunching measure is defined as (average handle time)/(calls per time interval). Load remaining is defined as (average handle time)×(number of calls not answered in a predetermined service time). Bunching and load remaining are combined, either as a linear combination or through multiplication, which yields an overall index for each queue. The overall index for each queue is called the "I" of the queue. At 412 the total work computed, or W, is distributed across all the affected queues in linear proportion to the I values of all those queues. For all agents other than the changed agent, work distribution is recalculated as described above. This is effectively like assuming that every remaining agent is removed and re-added to the schedule, allowing the algorithm to proceed again. The addition of the changed agent causes the load remaining to change, and the adjustment of all remaining agents compensates for and empirically mimics second-order effects. All other agents' effective work is adjusted at 414. An estimate of effective staffing levels is output at 416.

If an agent has not been added or removed at 404, it is next determined whether the simulator should be run at 418. An adaptive algorithm is used to determine whether the simulator should be run. In one embodiment, the adaptive algorithm measures the cumulative error of using the estimation function from the results of simulation and uses it and a predetermined amount of allowed error to choose how many changes can be made to the schedule before running a simulation.

If it is determined that the simulator is not required, the scheduling process continues at 420. If it is determined that a simulation should be run, then the current schedule is simulated at 426. After simulation, the estimated effective staffing levels that were output at 416 are replaced by simulated effective staffing levels, and scheduling continues at 420. The schedule is evaluated at 422 to determine whether it is an acceptable schedule based upon predetermined criteria. If the schedule is acceptable, it is output at 424.

Figure 3:
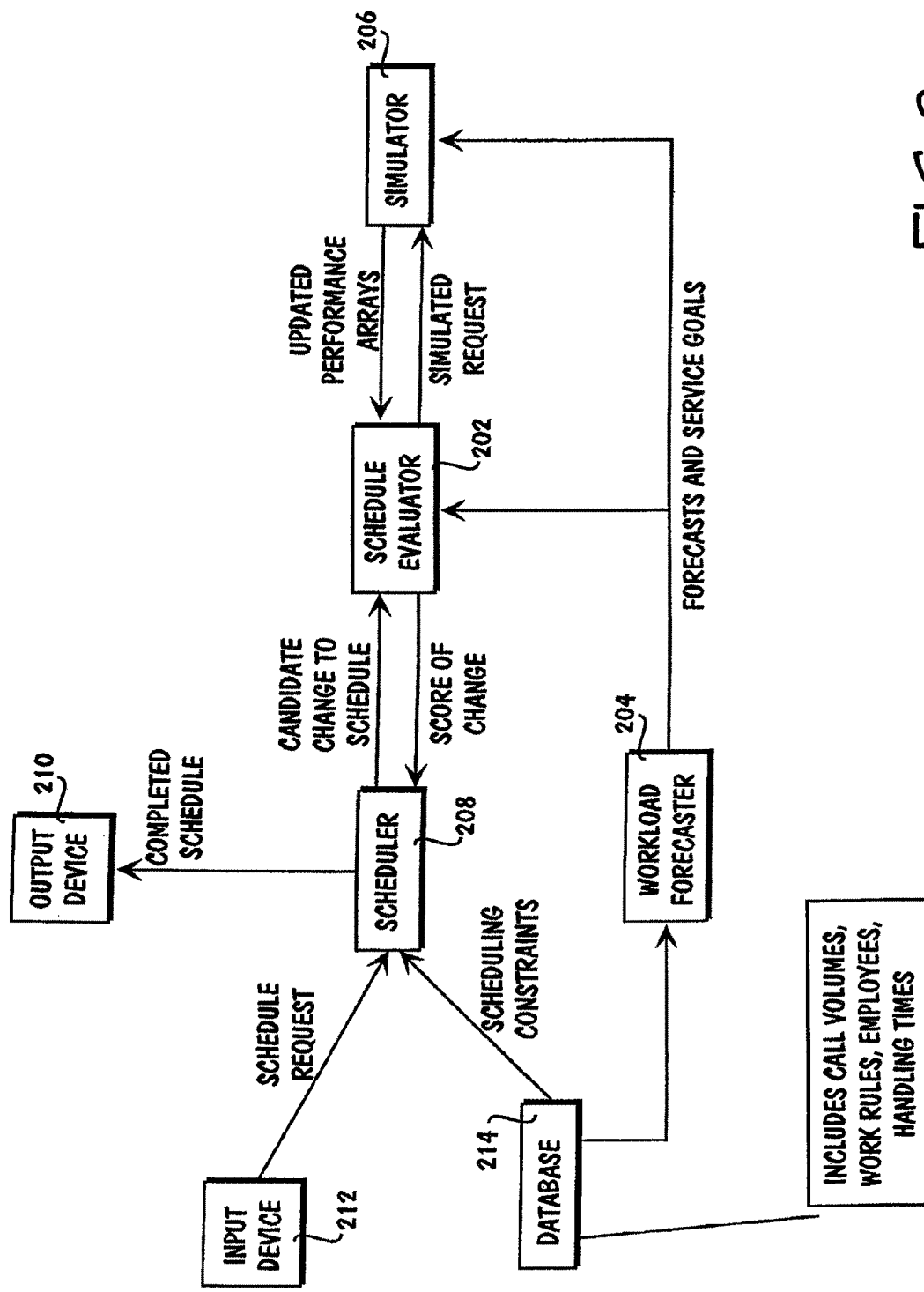
FIG. 3 is a block diagram showing the relationship between elements in an embodiment.

FIG. 3 is a block diagram showing the relationship between elements in an embodiment of the invention. The user accesses scheduling software, or scheduler, 208, using input device 212. Data from database 214, including call volumes, work rules, employee or agent designations, and handling times provide scheduling constraints for scheduler 208. The data from database 214 also provides input to the workload forecaster 204, which outputs forecasts of workload and service goals. The schedule evaluator 202 evaluates schedule changes generated by the scheduler 208 and returns a score for the change. Based upon the score, the scheduler 208 determines whether to output a completed schedule to the output device 210 or to continue. The schedule evaluator also determines whether to simulate as previously described. The scheduler sends a request to the simulator 206 if a simulation is required. The simulator provides an estimate of the performance of the schedule in the form of updated staffing arrays, which include simulated effective staffing levels.

Figure 4:
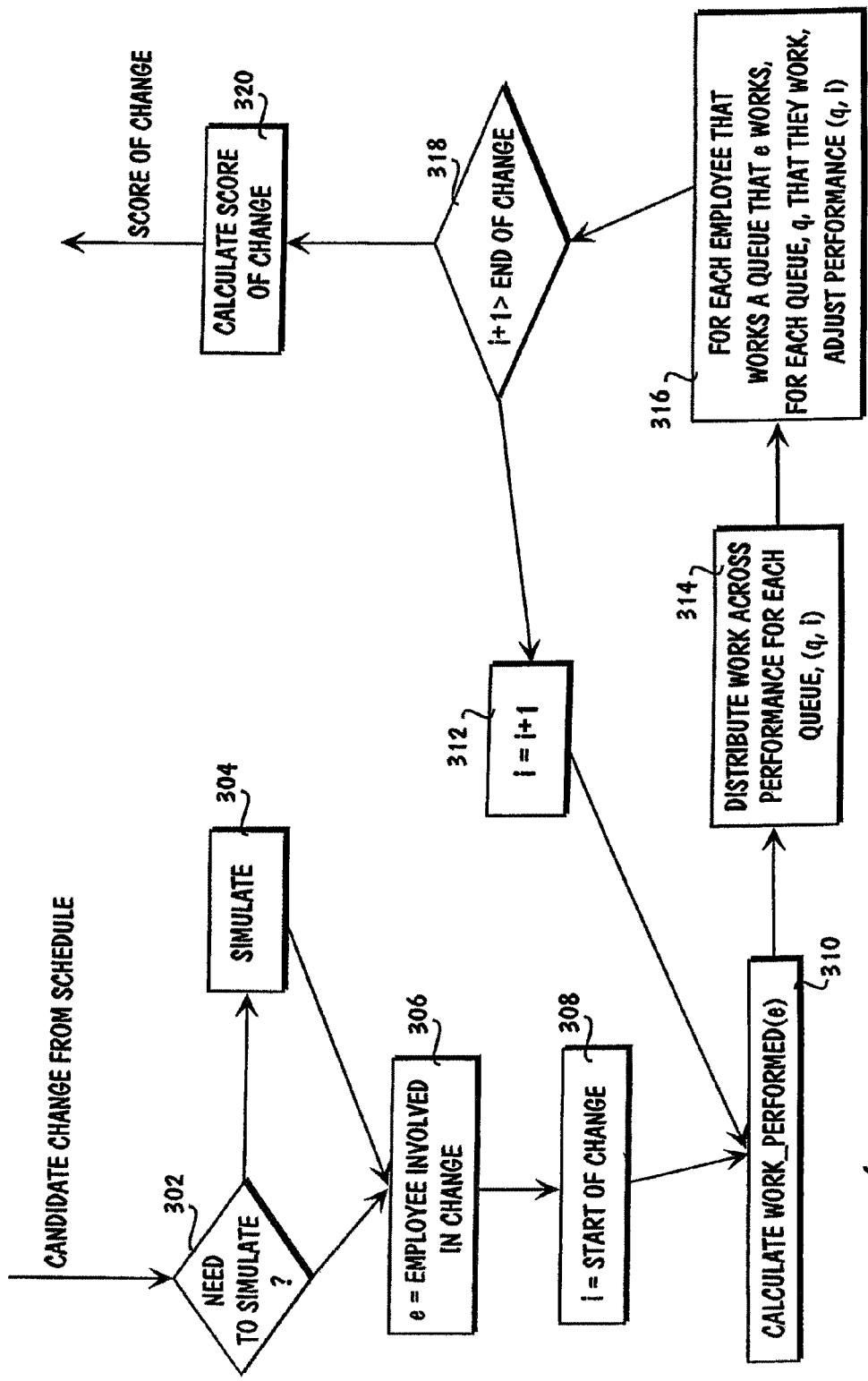
FIG. 4 is a diagram showing information flow in a schedule evaluator of one embodiment.

FIG. 4 is a diagram showing information flow in a schedule evaluator of one embodiment. When a candidate change occurs, it is determined at 302 whether to simulate. A candidate change is the addition or removal of an agent from the schedule by the user. Simulation occurs at 304, or if simulation is not required, the employee involved in the change is assigned a variable "e" at 306. The variable "i" represents a relatively small increment of time within a previously defined time period which the schedule is intended to cover, as shown at 308. The work performed by the changed employee is calculated at 310, and effect of the work on performance is distributed across each queue at 314. For each employee that works a queue also worked by the changed employee, and for each queue that each of those employees work, performance contributed by each of those employees is adjusted at 316. Next, it is determined whether the end of the previously defined time period affected by the change has been reached. That is, it is determined whether the effect of the change has been accounted for over the defined time period. If the end of the defined time period has been reached, the score of the change is calculated at 320. If the end of the defined time period has not been reached at 318, the time is incremented at 312, the calculation of work performed by e is repeated at 310, and the flow resumes as before.

Another aspect of the invention is the division of the scheduling method into parts for parallel processing. Parallel processing uses different processors simultaneously to perform different parts of the method for increased speed and efficiency. In one embodiment, simulation can be performed on one processor while scheduling is performed on one or more different processors. In another embodiment, the defined period to be scheduled is broken into sub-periods of, for example, fifteen minutes each. The scheduling of each sub-period is performed on a different processor.

The invention claimed is:

1. A method of operating a schedule system to generate a schedule for a plurality of agents in a contact center environment, the method comprising:
    receiving in a user interface a plurality of user inputs to a scheduling program stored on a storage device and executed by a processing device, including a number of agent designations each of which refers to a unique agent;
    receiving in the user interface a user input that changes the number of agent designations by indicating at least one changed agent;
    estimating in the processing device an effect of the at least one changed agent on effective staffing levels for each of various tasks;
    determining in the processing device whether to simulate the schedule based at least in part on an adaptive algorithm; and
    generating in the processing device estimated effective staffing levels for each of the various tasks.

2. The method of claim 1, wherein the adaptive algorithm is operative to measure an error that results from the estimating step to determine whether to simulate the schedule.

3. The method of claim 2, wherein the adaptive algorithm is operative to determine how many changes can be made to the schedule based on the error and a predetermined amount of allowed error to determine whether to simulate the schedule.

4. The method of claim 1, further comprising determining a number of changes that can be made to the schedule during the scheduling method without simulating a proposed schedule.

5. The method of claim 4, wherein estimating comprises:
    calculating a total effective work the changed agent will perform;
    scaling each task by at least one predetermined factor; and
    adjusting a work distribution for every unique agent other than the changed agent based upon the total effective work the changed agent will perform.

6. The method of claim 5, further comprising distributing the total effective work of the changed agent across a plurality of tasks.

7. The method of claim 5, wherein the at least one predetermined factor includes a measure of average time to handle a subtask divided by a number of subtasks per time interval, and a measure of how much work remains in a task based upon results of a previous simulation.

8. The method of claim 5, wherein calculating the total effective work the changed agent will perform comprises applying a function to: a number of skills of the changed agent; proficiencies of the changed agent; and priorities of the changed agent.

9. The method of claim 5, wherein adjusting the work distribution for every unique agent other than the changed agent includes adjusting an effective contribution to each task worked by one of the other unique agents by a factor reflecting that a different amount of work will be required for tasks worked by the changed agent.

10. A computer readable storage medium containing executable instructions which, when executed in a processing system, generate a schedule in a contact center environment by directing the processing system to:
receive a plurality of user inputs to a scheduling program, including a number of agent designations each of which refers to a unique agent;
receive a user input that changes the number of agent designations by indicating at least one changed agent;
estimate an effect of the at least one changed agent on effective staffing levels for each of various tasks;
determine whether to simulate the schedule based at least in part on an adaptive algorithm; and
generate estimated effective staffing levels for each of the various tasks.

11. The computer readable storage medium of claim 10, wherein the adaptive algorithm is operative to measure an error that results from the estimating step to determine whether to simulate the schedule.

12. The computer readable storage medium of claim 11, wherein the adaptive algorithm is operative to determine how many changes can be made to the schedule based on the error and a predetermined amount of allowed error to determine whether to simulate the schedule.

13. The computer readable storage medium of claim 10, further comprising the executable instructions configured to direct the processing system to determine a number of changes that can be made to the schedule during the schedule generation without simulating a proposed schedule.

14. The computer readable storage medium of claim 13, wherein the executable instructions, to direct the processing system to estimate the effect of the at least one changed agent on the effective staffing levels for each of the various tasks, directs the processing system to:
calculate a total effective work the changed agent will perform;
scale each task by at least one predetermined factor; and
adjust a work distribution for every unique agent other than the changed agent based upon the total effective work the changed agent will perform.

15. The computer readable storage medium of claim 14, further comprising the executable instructions configured to direct the processing system to distribute the total effective work of the changed agent across a plurality of tasks.

16. The computer readable storage medium of claim 14, wherein the at least one predetermined factor includes a measure of average time to handle a subtask divided by a number of subtasks per time interval, and a measure of how much work remains in a task based upon results of a previous simulation.

17. The computer readable storage medium of claim 14, wherein the executable instructions, to direct the processing system to calculate the total effective work the changed agent will perform, directs the processing system to apply a function to: a number of skills of the changed agent; proficiencies of the changed agent; and priorities of the changed agent.

18. The computer readable storage medium of claim 14, wherein the executable instructions, to direct the processing system to adjust the work distribution for every unique agent other than the changed agent, directs the processing system to adjust an effective contribution to each task worked by one of the other unique agents by a factor reflecting that a different amount of work will be required for tasks worked by the changed agent.

19. A computer-implemented method for generating a schedule in a contact center environment, the method comprising:
initiating an automatic scheduling process that receives agent data including skill sets as an input;
determining, in a computer system, whether to simulate a proposed schedule based at least in part on an adaptive algorithm, the adaptive algorithm including measuring an error of using an estimation function from results of the simulation and a predetermined allowed error;
determining whether a change has been made to the agent data;
estimating an effect of the change made to the agent data; and
generating estimated effective staffing levels for each of the various tasks.

* * * * *